April 3, 1951     C. E. PLOUFF     2,547,282
FISHING REEL
Filed Nov. 4, 1944     2 Sheets-Sheet 1
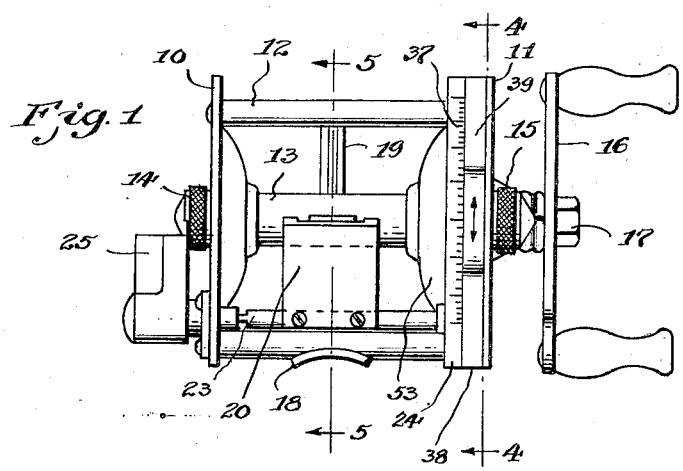
INVENTOR.
Clifford E. Plouff
BY Barnes, Kisselle, Laughlin & Raisch
Attorneys.

April 3, 1951  C. E. PLOUFF  2,547,282
FISHING REEL
Filed Nov. 4, 1944  2 Sheets-Sheet 2

INVENTOR.
Clifford E. Plouff
BY Barnes, Kisselle, Laughlin & Raisch
Attorneys.

Patented Apr. 3, 1951

2,547,282

UNITED STATES PATENT OFFICE 2,547,282

FISHING REEL

Clifford E. Plouff, Seahurst Park, Wash., assignor to Copeman Laboratories Company, Flint, Mich., a corporation of Michigan Application November 4, 1944, Serial No. 561,883

6 Claims. (Cl. 242—84.5)

This invention relates to fishing reels and particularly to a reel provided with means which may be pre-set by the fisherman to control and limit the distance which the bait is cast.

The invention further provides an improved and positive means to prevent the spool from over-riding the line when a cast is made, such action being commonly known as "back-lash."

A further object is to provide a drag brake which exerts a maximum drag at the end of the cast instantly, to positively terminate rotation of the spool, but which is released and exerts no braking effect whatsoever after the hand crank is rotated a few turns to reel in the line.

Other objects and advantages of the invention will be readily apparent from the following description and accompanying drawings wherein:

Fig. 1 is a rear elevation showing the reel assembly.

Fig. 2 is an elevation showing the left end of the assembly of Fig. 1.

Fig. 3 is an elevation showing the right end of the assembly of Fig. 1.

Fig. 6 is a fragmentary section taken on line 6—6 of Fig. 2.

Fig. 7 is a sectional view taken on the line 7—7 of Fig. 3.

Figure 4:
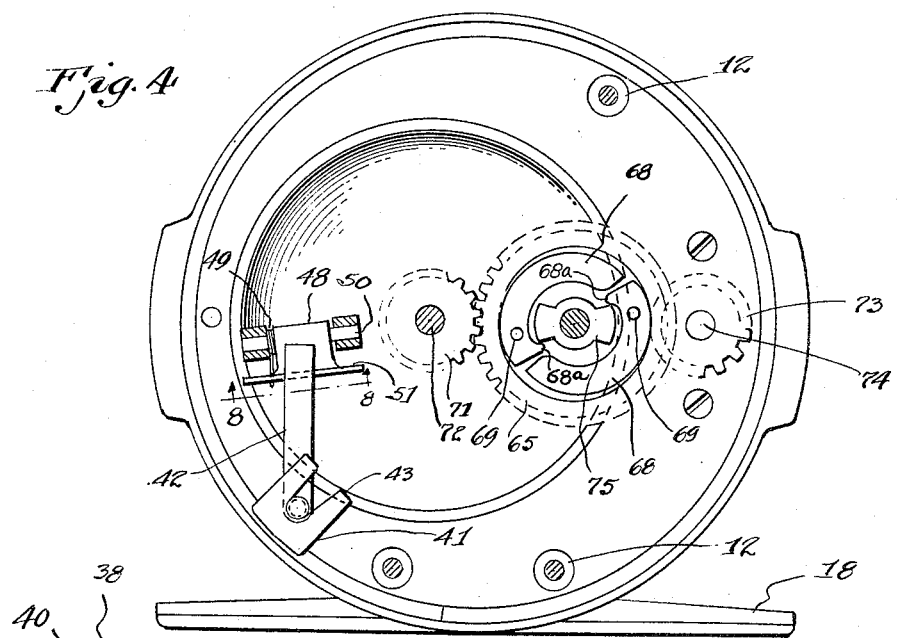
Fig. 4 is an enlarged view, partly in section, taken on the line 4—4 of Fig. 1.

In the drawings, Fig. 1 shows a reel assembly comprising a tail plate 10 joined to, but spaced from, a head plate 11 by three spaced pillars 12. The head and tail plate support a spool assembly 13 on which the line is wound. The spool assembly is supported at its ends in bearings 14 and 15, mounted on the tail plate 10 and head plate 11 respectively. A crank assembly 16 is attached to the reel by a nut 17 for the purpose of actuating the spool assembly in a manner to be hereafter described.

A reel seat 18 is rigidly attached to the two lower pillars 12 and provides a means for attaching the reel to a fishing rod (not shown). A conventional level wind mechanism 19 is likewise mounted on the reel assembly. As previously stated, the invention provides a metering device which may be pre-set by the operator to predetermine the length of line to be unreeled when a cast is made. This metering device has incorporated therewith a means for controlling both the primary back-lash, when the cast is initiated, and the secondary back-lash, when the bait strikes the water at the end of the cast.

Fundamentally, the distance control is obtained by a pre-set device which, after a predetermined length of line has been unreeled, thus decreasing the spool diameter, permits the operation of a positive brake which instantly engages the rotating spool to prevent further rotation thereof.

Figures 5, 8, 9:
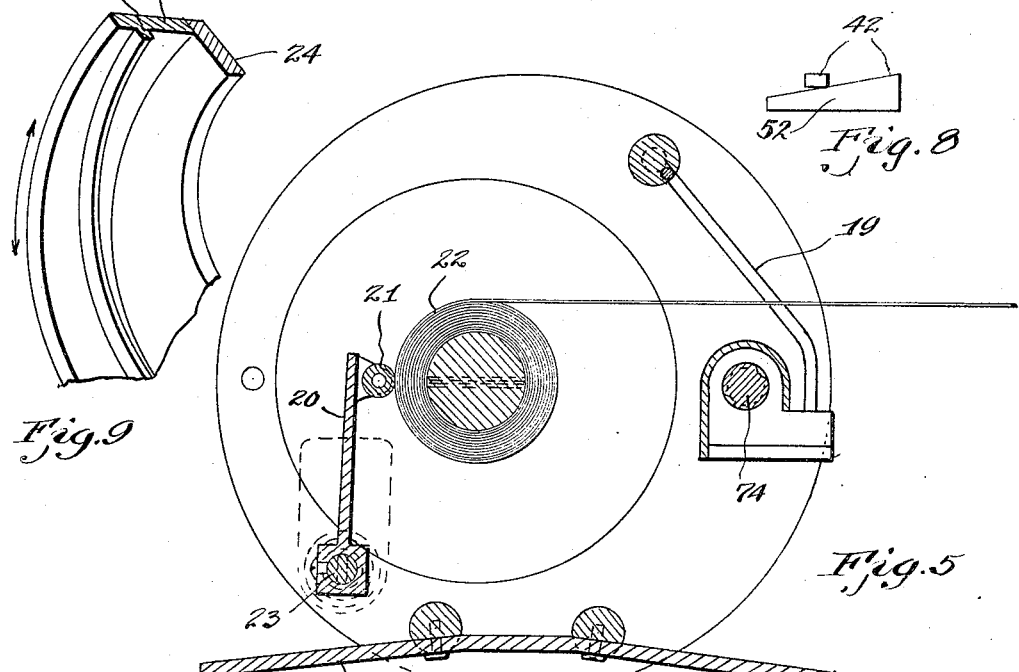
Fig. 5 is an enlarged view, partly in section, taken on the line 5—5 of Fig. 1.
Fig. 8 is a sectional view taken on the line 8—8 of Fig. 4, showing the brake control arm.
Fig. 9 is a perspective view of a portion of the dial setting ring and cam surface for controlling the ultimate movement of the brake arm.

Referring to Fig. 5, there is shown a plate 20 having a roller 21 attached to its upper end, which roller bears against the spool windings 22. The lower end of the plate is rigidly attached to a rotatable shaft 23, which shaft is rotatably supported at one end in the tail plate 10, and at its other end in a ring 24 supported by pillars 12 (Fig. 6).

Referring to Fig. 6 for a more complete showing of the primary back-lash control, a knob or key 25 is rotatably mounted on a spring casing 26, which casing is rigidly attached to tail plate 10. The casing 26 is provided on its outer cylindrical surface nearest the tail plate 10 with serrations 27. A spring-pressed pawl 28 is disposed in the knob 25 for the purpose of engaging the serrations 27 and thereby holding the knob in place when it has been turned by the operator.

A tapered shaft 29 is rigidly attached to the knob 25 as shown at 30, and turns with the knob. The tapered end of the shaft 29 extends through the spring casing 26 and abuts the end of a slotted shaft 31, which shaft is rotatably supported by a plain bearing 32 formed in the tail plate 10. A coiled spring 33 has one of its ends 34 secured to the tapered shaft 29, and its other end 35 attached to the slotted shaft 31. The slotted shaft 31 receives the reduced end portion 36 of shaft 23 whereby the shafts 31 and 23 rotate as a unit.

In the operation of the portion of the device just described, the tension on spring 33 is set by the operator after a number of trials to determine his casting strength, that is, the force with which he usually casts. Once this has been determined, the spring tension may be left at that setting, subject to an occasional check. The tension of this spring is imparted to the plate 20 all through the cast, this plate 20 being the plate which bears against the spooled line. Thus the friction between the roller 21, carried by the plate 20, and the spool, causes a dragging action which serves as a brake on the spool as it is being unwound, thus serving as a primary back-lash control. However, it is desirable that the resistance of the plate 20 and roller 21 to the unwinding of the spool be decreased after a considerable amount of line has been unreeled.

This is accomplished by two factors, (1) the decreasing diameter of the spool tends to unwind the spring, or rather to allow the spring to unwind, and (2) the inner coils of the spring 33 tend to contract more than the outer coils because of the tapered portion of shaft 29. This really means that the spring 33, because of the tapered shaft 29, acts as two separate springs having entirely different tensions. The spring 33 is shown in Figure 6 under little tension but when key 25 is turned the spring will wind up and decrease in diameter to adapt itself to the mandrel shaft. In so doing the coils at the right (Fig. 6) will be smaller and under greater tension but they will also unwind first as plate 20 shifts with the line run out.

The secondary back-lash control, which becomes effective at the end of the cast, comprises a positive brake which is automatically and instantly applied when a predetermined length of line has been unreeled. Referring to Fig. 1, the ring 24 which is supported by the pillars 12, is provided with a scale 37 which may be graduated in feet, meters, or any other measure of length. A rotatable ring 38, also supported on pillars 12, is interposed between 24 and head plate 11. This ring may carry a pointer, such as an arrow 39, or any other suitable indicia.

The ring 38 (Fig. 6) is constructed to provide a means for setting a control to determine the length of line to be unreeled. The inner surface of ring 38 carries a track 40 in the form of a single spiral which extends on the inside of the ring from one side to the other. A member 41 rides on the track 40 and is adjustably positioned to the right or left in Fig. 6, as determined by the position of ring 38, which is in turn determined by the length of line to be unreeled. An arm 42 is rigidly connected to the outer end of shaft 23 and lies between the two fingers 43 formed on member 41, so that movement of the member 41 to the right or left (Fig. 6) also moves the arm 42 in the same direction. The slotted connection 31 with reduced end portion 36 of shaft 23 permits such lateral movement.

A supporting member 44, having an inwardly extending arm 45, is rigidly attached to the head plate 11 by suitable means such as a screw 46. The lower end of arm 45 provides a pivoted bearing 47 for a brake-carrying member 48. Member 48 is constantly urged into contact with arm 42 by a coiled spring 49 (Fig. 4) encircling the shaft 50, which shaft is pivoted in arm 45 of member 44. The brake member carries a braking surface 51, which surface comprises a small piece of oil-resistant, flexible and resilient material such as neoprene or some other synthetic rubber-like material. The side of member 48 opposite the braking surface 51 carries a projection 52 which engages the upper end of arm 42. The projection 52 is tapered and is thus shifted laterally by movement of arm 42.

When a predetermined amount of line has been released, as determined by the setting of ring 38, member 41 and arm 42, the arm 42 contacts the tapered side of the projection 52, rotating member 48 about its pivot, and causing the braking surface 51 to engage the rotating bell 53. This bell is part of and rotates with the spool assembly in a clockwise direction as viewed in Fig. 4 when line is feeding out. After such contact is made the bell has a tendency to pick up the shoe 51 and to continue to rotate, but as it does so, for a fraction of a turn only, it compresses the resilient brake shoe 51 against itself with a wedging action which causes an immediate termination of the rotation of the bell 53 and the spool assembly and prevents further release of the line. In the braking movement the arm 48 moves in the direction of the bell surface which it is to contact. This sudden termination of the bell's rotation in the outgoing direction of the line causes a reactive force to be set up which rotates the bell a fraction of a revolution in the opposite direction, but sufficient to release the brake shoe 51, so that the pivoting member 48 falls back in contact with actuator arm 42 in which position shoe 51 first contacted the bell 53, whereupon the reel is ready for the winding-in operation. Thus, the braking action of member 51 performs two functions. It automatically and positively stops rotation of the spool in the outward direction, thus preventing back-lash, or continued rotation of the spool after the bait hits the water, and, by reason of its related mechanism it stops such rotation when a predetermined amount or length of line has been unreeled.

The invention also contemplates the provision of an automatic free-spooling device operable when a cast is made to free the spool assembly from the handle or crank, and which is rendered automatically inoperative when the crank is turned to reel in the line. In previous devices of this type with which I am familiar, it has been necessary for the operator to make some manual adjustment on the reel, either before the cast is made or before the line is reeled in.

Referring to Figs. 7 and 4, a flange or bushing 60 is rigidly attached to the head plate 11. This flange serves as a bearing for a hollow shaft 61, to the outer end of which the crank 16 is attached by the nut 17. A solid shaft 62 extends from the interior of the spool assembly into the hollow portion 63 of shaft 61, which hollow portion serves as a bearing for the shaft 62. The shaft 62 is rigidly attached to a bridge member 64 which in turn is rigidly attached to the head plate 11. Shaft 62 serves as a support for a large, hollow externally toothed gear member 65, and the gear member 65 is provided with a flange 66 to which is rigidly attached a pinion 67. Thus the gear 65 and pinion 67 rotate as a unit.

It should be understood that the gear 65 and its flange 66 are freely rotatable about the shaft 62. The gear 65 has a hollow interior of cylindrical shape which serves as a friction clutch drum. The shoes which engage this drum are designated by numeral 68, and as shown in Fig. 4 are of arcuate form and pivoted at one end by pins 69 to a plate 70 which is freely rotatable about shaft 61. The plate 70 is disposed just inside the head plate 11, and the shoes 68 are disposed inside the hollow, cylindrical portion of gear 65.

Externally toothed gear 65 drives pinion 71, which is rigidly attached to shaft 72 which drives the spool holding the fishing line. Pinion 67 drives gear 73, attached rigidly to the shaft 74 of level wind assembly 19. Shaft 61 carries at its inner end a double cam 75 which, when the crank 16 is rotated by the operator causes the shoes 68 to expand and contact the inner surface of hollow gear 65, thus positively driving this gear.

In the operation of my free spooling device, when a cast is made the brake shoes 68 are in the position shown in Fig. 4, that is, substantially out of contact with the braking surface of gear 65. Thus the spool assembly is free to rotate without turning the crank 16. However, when the cast has been completed, and the operator desires to reel in the line, he rotates the crank 16 in a clockwise direction (Fig. 4) in the usual manner, thus turning the cam 75 and forcing the shoes 68 into driving contact with the internal surface of gear 65. Thereupon the gear 65 is rotated clockwise which in turn rotates the gear 71 in a counter clockwise direction, which in turn rotates the spool 22 in a counter clockwise direction and reels in the line. When the line has been all reeled in the crank 16 is released and the shoes 68 drop by inertia from engagement with the gear 65 or may be released to a position of disengagement by a slight backward movement of the crank which will cause cam 75 to contact heel projections 68a on shoes 68 to cock the shoes inwardly. Likewise in a casting operation the cam 75 would be thrown against the projections 68a to disengage the shoes.

While the foregoing description discloses a preferred embodiment of my invention, it is understood that other embodiments may be constructed, and the measure of the invention shall be the following claims.

I claim:

1. In a fishing reel of the type having a rotatable spool for carrying line, a rotatable shaft extending axially parallel with, but outside the confines of the spool, a torsional spring acting on said shaft, means for adjusting the torsional effect of said spring on said shaft, a plate mounted on said shaft having one end bearing toward the center of the reel to exert frictional resistance on the line, a lever on the other end of the shaft movable with the plate as said reel unwinds and a brake member mounted on said reel adapted when shifted to bear against a revolving portion of said reel to brake the same and so positioned to be influenced by the movement of the lever to brake the reel after a predetermined reel out.

2. In a fishing reel of the type having a rotatable spool for carrying line, a rotatable shaft extending axially parallel with, but outside the confines of the spool, a torsional spring acting on said shaft, means for adjusting the torsional effect of said spring on said shaft, a plate mounted on said shaft having one end bearing toward the center of the reel to exert frictional resistance on the line, a lever on the other end of the shaft movable with the plate as said reel unwinds and a brake member mounted on said reel adapted when shifted to bear against a revolving portion of said reel to brake the same and so positioned to be influenced by the movement of the lever to brake the reel after a predetermined reel out, and adjustable means for shifting said lever lengthwise of said shaft to vary the point in reel-out at which it actuates the brake member.

3. In a fishing reel of the type having a rotatable spool for carrying line mounted between two frame members, a rotatable shaft extending between said members, a torsional spring acting on said shaft, a friction member mounted on said shaft having one end bearing toward the center of the reel to exert frictional resistance and packing pressure on the reeled line, a radial extension on said shaft movable with the friction member as said reel unwinds, and a brake member mounted on said reel adapted when shifted to bear against a revolving portion of said reel to brake the same and positioned to be influenced by the movement of said radial extension to brake the reel after a predetermined reel out, the portion of the shaft on which said radial extension is mounted being splined with respect to another portion, and means to shift a portion of the shaft and radial extension thereon adjustably endwise to alter the point in reel-out at which the brake member is actuated.

4. In a fishing reel of the type having a rotatable spool for carrying line mounted between two frame members, a rotatable shaft extending between said members, a friction member mounted on said shaft having one end bearing toward the center of the reel to exert frictional resistance and packing pressure on the reeled line, an adjustment key mounted on said frame having a cylindrical chamber aligned with said shaft and a spring mandrel therein tapered toward said shaft, and a torsional spring concentric with said shaft and chamber having one end fastened to said shaft and the other end lying within the cylindrical chamber of and fastened to said key whereby torsion placed on said spring will cause said spring to wrap on to said tapered mandrel.

5. In a fishing reel of the type having a rotatable spool for carrying line mounted between two frame members, a brake member movably positioned on one of said frame members adapted to shift toward a revolving portion of said spool in the same direction as the reel-out motion of said revolving portion, said brake member being resiliently positioned to be picked up by said revolving portion when moved into contact therewith to cause a binding brake action, and means associated with said brake member responsive to a predetermined reel-out motion of said spool to shift said brake member toward said moving portion of said spool.

6. In a fishing reel of the type having a rotatable spool for carrying line mounted between two frame members, a brake member movably positioned on one of said frame members adapted to shift toward a revolving portion of said spool in the same direction as the reel-out motion of said revolving portion, said brake member being resiliently positioned to be picked up by said revolving portion when moved into contact therewith to cause a binding brake action, means associated with said brake member responsive to a predetermined reel-out motion of said spool to shift said brake member toward said moving portion of said spool, said last-named means mounted on said shaft having one end bearing toward the center of the reel to exert frictional resistance on the line, resilient means urging said frictional means against said line and a radial extension on another portion of said shaft movable with said frictional means to contact said brake member to shift the same toward said revolving portion of the spool.

CLIFFORD E. PLOUFF.

REFERENCES CITED

The following references are of record in the file of this patent:

UNITED STATES PATENTS

| Number | Name | Date |
|---|---|---|
| 699,763 | Mathews | May 13, 1902 |
| 929,867 | Meisselbach et al. | Aug. 3, 1909 |
| 1,554,786 | Case | Sept. 22, 1925 |
| 1,765,903 | Case | June 24, 1930 |
| 2,152,969 | Nash | Apr. 4, 1939 |
| 2,163,030 | Gehr | June 20, 1939 |
| 2,317,835 | Watson | Apr. 27, 1943 |
| 2,326,645 | Hill | Aug. 10, 1943 |
| 2,396,071 | Anderson et al. | Mar. 5, 1946 |

FOREIGN PATENTS

| Number | Country | Date |
|---|---|---|
| 38,168 | France | Jan. 13, 1931 |

(Addition to No. 579,018.)